United States Patent [19]

Bresson

[11] 4,384,780
[45] May 24, 1983

[54] LIGHT SEAL APPARATUS FOR A WINDOW IN A CAMERA BACK

[75] Inventor: Richard J. Bresson, Hamlin, N.Y.
[73] Assignee: Eastman Kodak Company, Rochester, N.Y.
[21] Appl. No.: 355,789
[22] Filed: Mar. 8, 1982
[51] Int. Cl.³ .............................................. G03B 17/02
[52] U.S. Cl. .................................... 354/288; 354/202
[58] Field of Search ............... 354/202, 275, 288, 289, 354/354, 217, 203, 277

[56] References Cited

U.S. PATENT DOCUMENTS

| | | | |
|---|---|---|---|
| 1,001,387 | 8/1911 | Goddard | 354/192 |
| 1,709,782 | 4/1929 | Denniss et al. | 354/203 |
| 2,132,696 | 4/1937 | Nagel | 354/217 |
| 3,523,496 | 8/1970 | Nerwin | 354/288 |

Primary Examiner—Alan Mathews
Attorney, Agent, or Firm—Roger A. Fields

[57] ABSTRACT

In a bottom-loaded camera, a light seal is located between a loading chamber adapted to receive a film cassette and a window in the camera back for viewing film-related information on the loaded cassette. The light seal is movably connected to the camera back in light-sealing engagement therewith and shields film from the cassette against light entering the window. Manual operation of an exterior member, moves the light seal away from the chamber to provide space for loading the cassette in the chamber, and against the cassette to effect a lighttight connection between the camera back and the cassette.

10 Claims, 5 Drawing Figures

LIGHT SEAL APPARATUS FOR A WINDOW IN A CAMERA BACK

BACKGROUND OF THE INVENTION

1. Field of the Invention

The invention generally relates to photographic cameras having a window through which information on a film cassette or film backing may be viewed. More particularly, the invention relates to light seal apparatus for shielding film in such a camera from light entering the window.

2. Description of the Prior Art

It is well known to provide a window in the back of a camera for viewing film-related information on a cassette or the opaque backing of film in the cassette. In many 126 and 110 size cameras, the window is located in a back door, opposite an opening in a bridge portion of the cassette which connects the film supply and take-up chambers of the cassette. When the film is advanced along the bridge portion from the supply chamber to the take-up chamber, exposure numbers on the opaque backing behind the film are successively visible at the opening and may be viewed through the window. However, the emulsion side of a film section in the bridge portion must be shielded from light entering the window. This shielding should be done without covering the opening in the bridge portion and, typically, is by a labyrinth light-trap composed of elongate side walls on the bridge portion and mating wall structure on the inside of the camera.

In 35 mm cameras, the film is advanced out of a light-trapped film slot in a single chamber cassette and onto a rotatable take-up core. After exposure, the film usually has to be rewound into the cassette before the cassette is removed from the camera. Those cameras having a window in the back door, such as the Fujica cameras, manufactured by Fuji Photo Company, typically include a black sponge-like rubber light seal disposed about the window on the inside of the back door. When the door is closed, the window is located opposite the cassette to view film-related information on the cassette, and the light seal is compressed between the cassette and the back door to prevent light entering the window from reaching the film advanced out of the cassette.

Preferably, my invention allows film-related information on the cassette or the film backing to be viewed through the window, but is embodied in a camera having a bottom door, openable to load and unload the cassette. This is in contrast to the cameras described above, which use the back door for cassette-loading and unloading. In general, the bottom-loading cameras, of which I am aware, do not have window in the camera body for viewing film-related information on the cassette or the film backing. Rather, these cameras usually include exterior means for displaying such information, which is mechanically or electronically obtained by sensing indicia on the film or the cassette.

SUMMARY OF THE INVENTION

My invention relates to a photographic camera, such as the 35 mm type, wherein a loading chamber is adapted to receive a film cassette and a camera back has a window opposite said chamber, for example, to view film-related information on the cassette. Specifically, the invention comprises:

light seal means, movably connected to the camera back in light-sealing engagement therewith, for shielding film from the cassette against light entering the window; and means for moving the light seal means between the camera back and the loading chamber in respective directions, away from the chamber, to provide space for loading the cassette in the chamber and, toward the chamber, to shield the film.

In a preferred embodiment of the invention, a bottom door on the camera body is opened to load the film cassette endwise, i.e., axially, in a well in the loading chamber. The window in the camera back is disposed for viewing film-related information on the cassette. A frame surrounding the window projects from the inside of the camera back to a location slightly spaced from the well in the loading chamber. The light seal means includes an opaque sponge-like rubber gasket which extends about the frame and is movable in opposite directions, along the frame, between the camera back and the well. The means for moving the gasket includes a pair of spaced follower pins, fixed to the gasket, and a manually movable slide having a cam finger extending between the pins to impart motion to the gasket as the slide is moved. Movement of the slide in one direction moves the gasket along the frame, away from the well, to provide space for loading the cassette through the bottom door. Movement of the slide in another direction moves the gasket against the cassette to effect a lighttight connection between the camera back and the cassette, which prevents light entering the window from reaching film advanced out of the cassette.

DESCRIPTION OF THE PREFERRED EMBODIMENT

The invention is described as being embodied in a 35 mm camera. Because such cameras are well known, this description will be directed in particular to those elements forming part of or cooperating directly with the preferred embodiment. It is to be understood, however, that other elements not specifically shown or described may take various forms known to persons of ordinary skill in the camera art.

Figure 1:
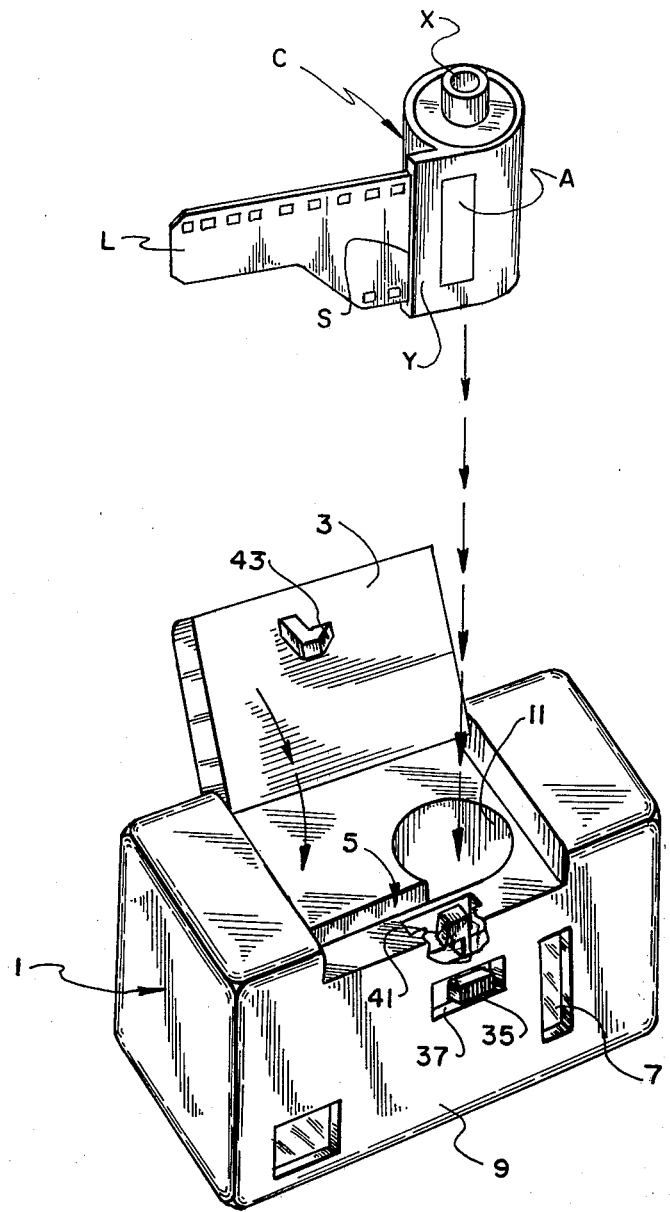
FIG. 1 is a rear perspective view of a 35 mm camera, shown bottom side up with a bottom door opened for cassette-loading.

Referring now to the drawings, and in particular to FIG. 1, there is shown a bottom-loaded 35 mm camera adapted to receive a film cassette C. The camera is depicted upside down to illustrate the manner in which the film cassette is loaded. The film cassette C is a conventional one, including a rotatably mounted core member X, which supports a coiled 35 mm filmstrip in the cartridge interior. The filmstrip has a leader section L extending out of a light-trapped slot S in a lipped portion Y of the cassette. Preferably, the camera has a body 1 that includes a hinged bottom door 3. The door 3 may be swung open to uncover a loading chamber 5 for receiving the film cassette C, endwise, and for receiving the extending leader L, longitudinal edge first, as shown in FIG. 1. A window 7 in a back side 9 of the body 1 is located opposite a cassette-receiving well 11 in the loading chamber 5. The window 7 is provided for viewing a film-related information area A on the loaded cassette. Typically, the information area A includes the film type, the ASA and DIN numbers, and the maximum number of exposures, although other information, such as the expiration date of the film, may be included.

Figure 2:
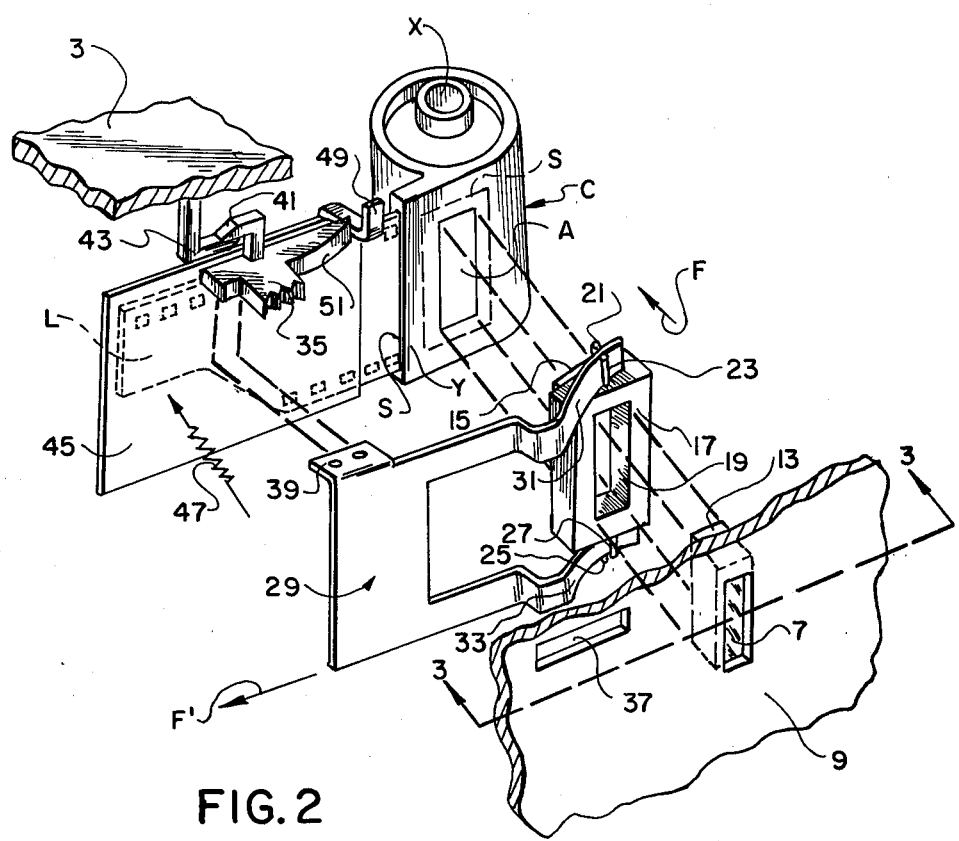
FIG. 2 is an exploded perspective view of a light seal apparatus in the camera according to a preferred embodiment of the invention, depicting the components of such apparatus in relative positions for preventing light entering a window in the camera back from reaching film advanced out of the cassette.
Figure 3:
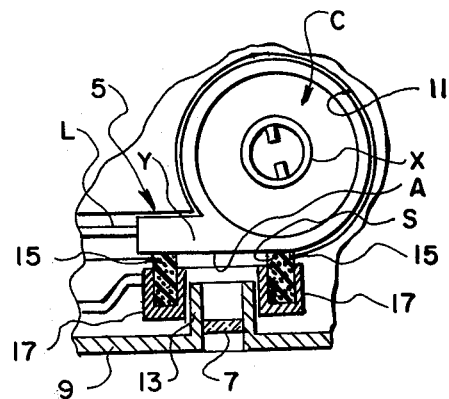
FIG. 3 is a sectional view of the light seal apparatus as seen in the direction of the arrows from the line 3—3 in FIG. 2.
Figure 4:
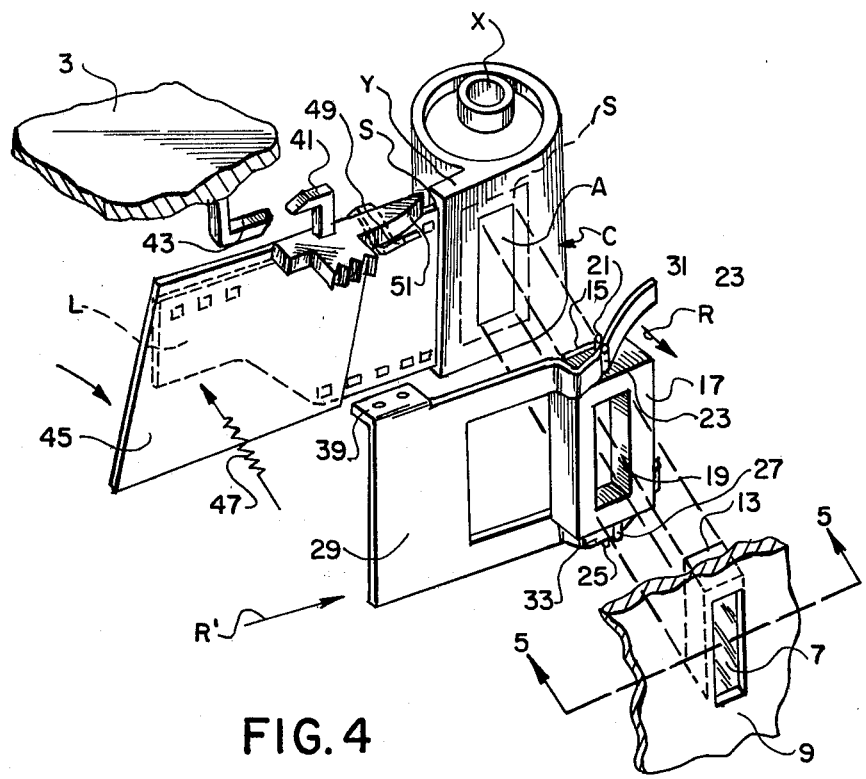
FIG. 4 is an exploded perspective view similar to FIG. 2, depicting the components of the light seal apparatus in relative positions to facilitate cassette-loading.
Figure 5:
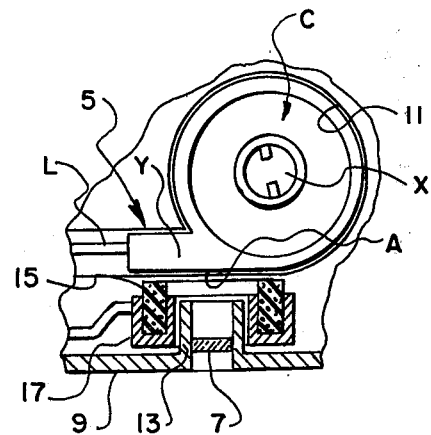
FIG. 5 is a sectional view of the light seal apparatus as seen in the direction of the arrows from the line 5—5 in FIG. 4.

As shown in FIGS. 2-5, a rigid frame 13 surrounds the window 7 and projects from the inside of the camera back 9 to a location slightly spaced from the cassette-receiving well 11. A light seal, such as an opaque sponge-like rubber gasket 15, is partially set in a similarly shaped support 17 extending closely about the frame 13. The gasket 15 and the support 17 have a common opening 19, aligned with the window 7, and are movable along the frame 13 in opposite directions F and R, depicted in FIGS. 2 and 4, respectively, between the inside of the camera back 9 and the cassette-receiving well 11. Movement of the gasket 15 and the support 17 in the direction R, away from the well 11, as shown in FIG. 5, provides space for loading the film cassette C into the well. Return of the gasket 15 and the support 17 in the direction F, as shown in FIGS. 2 and 3, positions the gasket against the loaded cassette along a region S surrounding the information area A on the cassette. Consequently, the gasket 15 and the support 17 form, with the frame 13, a lighttight connection between the camera back 9 and the cassette. Such connection prevents light entering the window 7 from spreading beyond the space between the window and the information area A, and fogging film advanced out of the cassette.

Manually operable means are provided for moving the gasket 15 and the support 17 in the opposite directions F and R. The means comprises two pairs of spaced follower pins 21, 23 and 25, 27, both fixed to the support 17, and a slide plate 29, supported by suitable rails, not shown, for movement in opposite directions F' and R', depicted in FIGS. 2 and 4, respectively. The slide plate 29 includes a spring-like cam finger 31 extending between the follower pins 21 and 23 and a similar cam finger 33 extending between the follower pins 25 and 27. Owing to this arrangement of the follower pins and the cam fingers, movement of the slide plate 29 in the direction F', as shown in FIG. 2, cams the gasket 15 and the support 17 in the direction F until the gasket is firmly pressed against the loaded cassette along the region S surrounding the information area A. Conversely, movement of the slide plate in the direction R', as shown in FIG. 4, cams the gasket and the support in the direction R, separating the gasket from the cassette.

An exterior push button member 35 for manually moving the slide plate 29 in the opposite directions F' and R' extends through a suitably light-trapped, elongate opening 37 in the camera back 9 and is secured to a flanged portion 39 on the slide plate. The button member 35 includes a latching element 41 which engages a latched element 43 on the inside of the bottom door 3, to hold the door closed, as the slide plate 29 is moved in the direction F' in FIG. 2. The latching element 41 separates from the latched element 43, to release the bottom door 3, as the slide plate 29 is moved in the direction R' in FIG. 4.

A retractable pressure plate 45 for holding film from the loaded cassette in an exposure plane is supported on the inside of the camera back 9 by a suitable spring mounting 47. The pressure plate 45 includes a finger-like follower 49, disposed in the travel path of an inclined cam edge 51 on the button member 35 as the button member is moved in the direction R'. Movement of the button member 35 in the direction R', as shown in FIG. 4, causes the cam edge 51 to bear against the follower 49, pivoting the pressure plate 45 from the exposure plane, toward the camera back 9, against the urging of the spring mounting 47. Accordingly, the pressure plate 45 is retracted to facilitate receipt of the film leader L in the loading chamber 5.

The invention has been described in detail with reference to a preferred embodiment thereof, but it will be understood that variations and modifications can be effected within the spirit and scope of the invention.

I claim:

1. In a photographic camera of the type wherein a loading chamber is adapted to receive a film cassette, and a camera back has a window opposite said chamber, the improvement comprising:

light seal means, movably connected to said camera back in light-sealing engagement therewith, for shielding film from the cassette against light entering said window; and means for moving said light seal means between said camera back and said chamber in respective directions, away from said chamber, to provide space for loading the cassette in said chamber and, toward said chamber, to shield the film.

2. In a photographic camera of the type wherein a loading chamber is adapted to receive a film cassette, and a camera back has a window opposite said chamber for viewing film-related information on the cassette, the improvement comprising:

a bottom door openable to load the cassette endwise in said chamber;

light seal means, movably connected to said camera back in light-sealing engagement therewith, for shielding film from the cassette against light entering said window; and manually operable means, movable in opposite directions, for moving said light seal means within said camera in respective directions, away from said chamber, to provide space for loading the cassette in said chamber and, toward said chamber, to shield the film.

3. The improvement as recited in claim 2, wherein said manually operable means moves said light seal means in opposite directions between said camera back and said chamber.

4. The improvement as recited in claim 2, wherein said manually operable means includes an exterior push member manually movable to move said light seal means within said camera.

5. The improvement as recited in claim 2, wherein said manually operable means includes cam follower means fixed to said light seal means and manually operable cam means for imparting motion to said cam follower means for moving said light seal means.

6. In a photographic camera of the type wherein a loading chamber is adapted to receive a film cassette, and a camera back has a window opposite said chamber, the improvement comprising:
- a frame surrounding said window and projecting from said camera back to a location adjacent said chamber;
- light seal means disposed about said frame for movement along said frame between said camera back and said chamber, for shielding film from the cassette against light entering said window; and
- manually operable means for moving said light seal means along said frame in opposite directions, away from said chamber, to provide space for loading the cassette in said chamber and, toward said chamber, to shield the film.

7. The improvement as recited in claim 6, wherein said manually operable means includes a pair of spaced follower pins fixed to said light seal means and a movable slide having a cam finger extending between said pins to impart motion to said light seal means as said slide is moved.

8. The improvement as recited in claim 7, wherein said cam finger is a spring finger for urging said light seal means against the cassette in said chamber.

9. The improvement as recited in claim 6, wherein said chamber is adapted to receive the cassette endwise at the bottom of said camera.

10. In a photographic camera of the type wherein a loading chamber is adapted to receive a film cassette, and a camera back has a window opposite said chamber for viewing film-related information on the cassette, the improvement comprising:
- a frame surrounding said window and projecting from said camera back to a location adjacent said chamber;
- light seal means, disposed about said frame for movement along said frame between said camera back and said chamber, for shielding film from the cassette against light entering said window; and
- manually operable means, including an exterior push member movable in opposite directions, for moving said light seal means along said frame in respective directions, away from said chamber, to provide space for loading the cassette in said chamber and, toward said chamber, to shield the film.

* * * * *